May 26, 1959

H. C. EICKMEYER 2,888,033

CONSTANT PRESSURE OUTLET VALVE

Filed June 18, 1954

INVENTOR.
Henry C. Eickmeyer
BY
Fish and Huff

United States Patent Office 2,888,033
Patented May 26, 1959

2,888,033

CONSTANT PRESSURE OUTLET VALVE

Henry C. Eickmeyer, Spokane, Wash.

Application June 18, 1954, Serial No. 437,767

5 Claims. (Cl. 137—505)

This invention is a valve which is particularly effective when employed in sprinkler irrigation systems although it is not limited thereto and which is controlled by means of the water pressure of the system.

In sprinkler irrigation systems, water is received from a source of water under pressure and is introduced into a main water supply pipe which is adapted for releasable communication with one or more distributing pipes forming a fluid conduit and comprising a plurality of contiguous pipe sections releasably united by means of couplers. Selected ones of these couplers are conventionally provided with stand pipes which receive water from the conduit and discharge it at their upper ends through a suitable sprinkler head. Since distributing pipes are manually or otherwise placed on the surface of the ground to provide means for applying water to a specific area, it is obvious that the distributor pipes will conform to the contour of the ground. When the distributor pipe is used on uneven ground, obviously, the several sprinklers are disposed at various elevations and are spaced from each other over a considerable length of pipe. It is well understood that water passing through a conduit is subject to a certain amount of pressure drop due to friction within the conduit and also because of the changes in elevation of the conduit, the water pressure at one elevation will be different from the pressure at another elevation. It is also apparent where the water pressure varies between two sprinklers having discharge orifices of exactly the same size, the quantity of water discharged thereby over any given period of time will vary with relation to the variations in pressure, thus causing uneven distribution of water from a sprinkler system; with a greater amount of water being discharged through sprinklers where the pressure is higher and a lesser amount through sprinklers where the pressure is lower.

It is, therefore, one object of this invention to provide a valve which may be applied to a fluid distributing system and controlled by means of the water pressure within the system.

Another object of the invention lies in the provision of a constant pressure outlet valve which is particularly adaptable to sprinkler irrigation systems for the purpose of maintaining a constant fluid pressure on the sprinkler head to insure equal distribution of water over a given area from a plurality of sprinkler heads.

Another object of the invention lies in the provision of a constant pressure outlet valve constructed and arranged so as to be easily included in a sprinkler irrigation system without altering the conventional component parts of the irrigation system.

Another object of the invention lies in the provision of a constant pressure outlet valve which is designed to be inexpensively manufactured from a minimum number of parts and thereby permit a plurality of the valves to be included in a sprinkler irrigation system without materially increasing the cost of the complete system.

These and other objects of the invention will become apparent during the course of the following description.

In the accompanying drawings, forming a part of this specification, and in which like numerals are employed to designate like parts;

Figure 3:
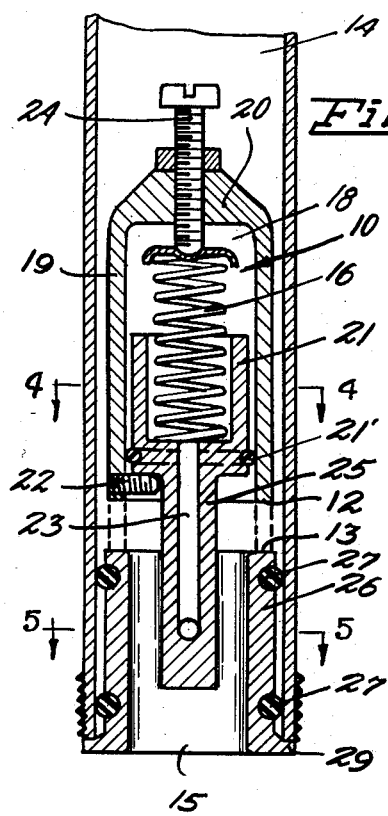
Figure 4:
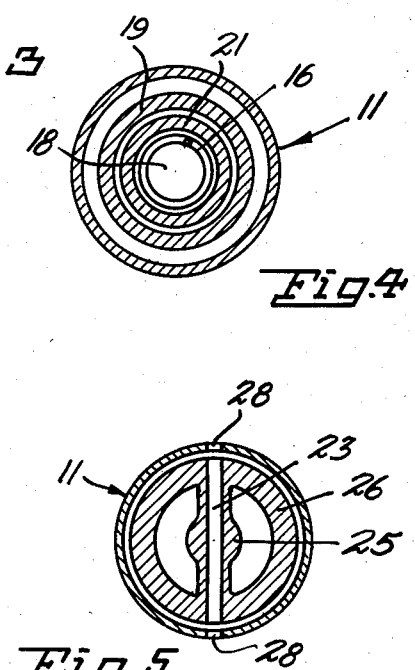
Figure 5:
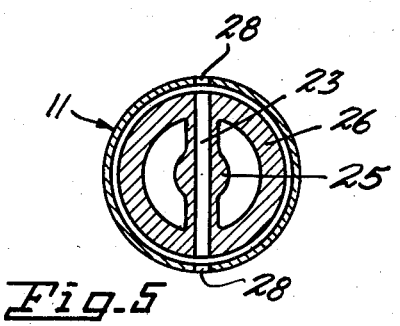

Figure 3 is a vertical diametric cross section of a modified species of the valve; and Figures 4 and 5 are horizontal cross sections as at lines 4—4 and 5—5 of Figure 3, respectively.

Referring now more particularly to the drawings, I have disclosed my invention as comprising a pressure responsive fluid tight walled chamber 10 which is adapted to be disposed within a portion of the water conduit 11 and is operably associated with a valve 12 movable toward and away from a valve seat 13 fixed in the conduit 11. It will be noted from the accompanying drawings that the walled chamber 10 is disposed on the discharge side 14 of the valve 12 so that it is sensitive to fluid pressures on the discharge side 14 as opposed to the inlet side 15. However, the chamber may be disposed on the inlet side for other valving functions than maintaining a constant pressure outlet, such as an automatic shut-off valve should the pressure become too great for a fixture to which water is supplied by the system. Other uses will be readily apparent to those skilled in the art to which this invention appertains. It will also be seen that the chamber 10 is provided with pressure responsive means yieldably urging the chamber to an expanded position and this means is shown to be in the form of a compression spring 16 which is disposed within the variable size inner sealed area 18 enclosed by the cylinder 19 having a head or closure 20 at one end and which is provided with a piston 21 associated with the cylinder 19 for relative reciprocal movement and has its movement out of the cylinder 19 limited by means of a bolt 22. It will thus be seen that as the water pressure increases the sprinkler system, the cylinder is compressed against the tension of spring 16 causing the sealed area 18 to diminish and the valve 12 to move toward valve seat 13 thereby diminishing or stopping the flow of fluid by the valve.

It appears obvious that the chamber 10 could be constructed to remain completely sealed and thus the fluid pressure would compress the chamber against air pressure therein, thus precluding the necessity for spring 16. However, to permit greater control and accuracy of the valve I find it expedient to provide a vent 23 communicating the sealed area 18 and the atmosphere (or at least communicating the sealed area with the area outside of the conduit 11).

Figure 1:
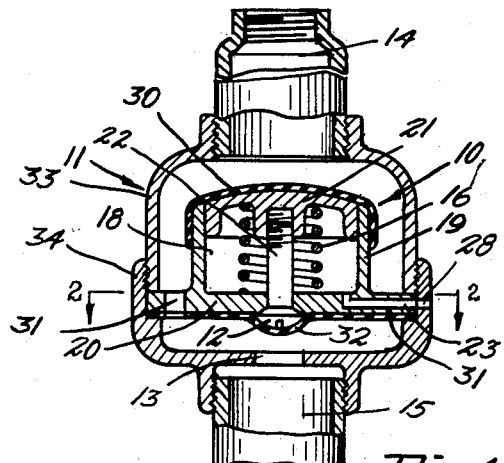
Figure 1 is a vertical diametric cross section taken through one embodiment of the valve constituting my present invention.
Figure 2:
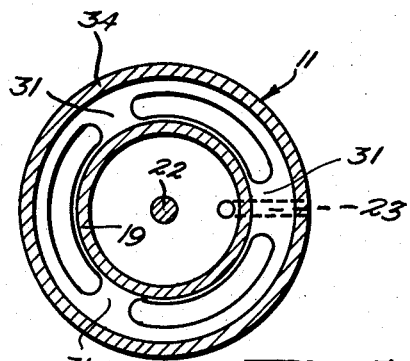
Figure 2 is a horizontal cross section as at line 2—2 of Figure 1.

As a constant pressure outlet valve the desired discharge pressure in the discharge end 14 of conduit 11 may be controlled by tension of the yieldable spring 16. In the species of Figure 1 this spring tension may be adjusted by rotation of bolt 22, and the species of Figure 3, by manual adjustment of bolt 24. In the first case it will be seen that the bolt is carried by the piston 21 whereas in the second disclosure the bolt is carried by the cylinder 19.

The essence of the invention is disclosed in both species. However, that construction shown in Figures 3, 4, and 5 is found to be less expensive to manufacture and is therefore preferable. In this structure it is seen that the piston 21 is rigidly fixed with relation to the conduit 11 and is supported on an axially extending arm 25 carried by a sleeve 26 which is insertable into the conduit 11. The sleeve is provided with inner and outer spaced annular sealing rings 27 which cooperate with the internal annular cylindrical face of the conduit 11 and provides a sealed space on area intermediate the rings and encircling the sleeve 26 within that portion of the conduit 11. To complete the vent 23 to the atmosphere I provide one or more apertures 28 in the conduit communicating with the area intermediate the annular ring 27. Therefore, it will be seen that the sealed chamber area 18 communicates through vent 23 and apertures 28 to the outside of the conduit 11. The sleeve 26 is provided with an annular flange 29 which limits the distance that the sleeve 26 may be inserted into the conduit. To apply this species of constant pressure outlet valve it is only necessary to slip the valve into the standard of the conduit and then thread the standard into a coupler or other pipe communicating boss and subsequently, if not previously completed, form the apertures 28.

It is thus apparent that the water pressure within the discharge end of the conduit 11 by exerting force upon the head 20 of the cylinder 19 forces the chamber 10, comprising the cylinder 19 and piston 21, together and by this movement air confined within the area 18 is expelled through the vent 23 and aperture 28. During this movement the valve 12 is moved toward the valve seat 13, thus restricting the flow of fluid into the constant pressure outlet valve and as the pressure decreases in the discharge end 14 the spring 16 expands the chamber 10 and moves the valve 12 away from the valve seat 13 permitting greater flow of fluid and thus resulting in increased pressure at the discharge end 14 of the conduit 11.

It will be seen in Figure 3 that the piston 21 is provided with an annular sealing ring 21' to prevent fluid leakage into or out of the area 18.

In Figure 1 the sealing means takes the form of a resilient cap 30 which covers the complete head of the piston and the open end portion of the cylinder 19. In this form the vent 23 is formed through at least one of the webs 31 which form a spider supporting the cylinder 19. The vent 23 communicates with an aperture 28 formed in the conduit 11. To insure greater accuracy and valving action between the valve 12 and the valve seat 13, in the species disclosed in Figure 1. I provide a rubber disc 32 which is apertured to permit flow of fluid from the supply end 15 to the discharge end 14 and which covers the head of the valve 12 and cooperates with the valve seat 13. It will also be noted that in the species disclosed in Figure 1 the conduit portion is enlarged into two housing sections, 33 and 34 which receive the threaded ends of a conventional pipe standard. The discharge end 14 may be the pipe threaded end of a conventional sprinkler head if desired.

Having thus described my invention, I claim:

1. The combination with a fluid conduit having a fixed valve seat through which fluid flowing through the conduit must pass; of a constant pressure outlet valve comprising, disposed within said conduit, a cylinder having one end closed and an annular edge at the opposed end; a piston disposed in said cylinder for reciprocation of said cylinder thereover and together with the cylinder defining a variable size sealed chamber; means having manually variable resiliency yieldably urging separation of said piston and cylinder; a sleeve insertable to a limited degree into said conduit and having a fluid tight area intermediate its length between said sleeve and said conduit; an arm rigid with the sleeve and supporting said piston and having a vent communicating said variable size sealed chamber with the sealed area surrounding the sleeve; a bore in the side wall of said conduit to permit free ingress and egress of atmospheric air to said variable size chamber, whereby to communicate air through the conduit and vent to the sealed chamber; the inner end of said sleeve constituting said valve seat through which fluid flowing through the conduit must flow and cooperating with said annular edge of said cylinder and constituting a valve whereby increased fluid pressure in said conduit shifts said cylinder toward said sleeve to control the flow of fluid therethrough.

2. The combination with a fluid conduit having an inlet end and a discharge end and a fixed valve seat through which fluid flowing through the conduit must pass; of a valve comprising, disposed within said conduit, a cylinder having one end closed; a piston disposed in said cylinder for reciprocation of said cylinder thereover and together with the cylinder defining a variable size sealed chamber; means yieldably urging separation of said piston and cylinder; said piston having means fixing it relative to said conduit and including a vent communicating said chamber externally of said conduit; said cylinder being disposed toward the discharge end of said conduit and operably associated with a valve disposed toward the inlet end and movable toward said valve seat when said chamber size is reduced, for restricting fluid flow through said conduit.

3. A constant pressure outlet valve for fluid conduit comprising in combination a yieldably biased pressure sensitive fluid-tight walled chamber adapted to be inserted into the conduit and permit flow of fluid thereby; a sleeve supporting said walled chamber and insertable into the bore of said conduit to a limited degree; said sleeve having exteriorly located spaced annular sealing rings for cooperating with said conduit and defining an annular fluid-tight area therebetween when disposed in said conduit; said sleeve having a vent communicating the interior of said chamber and the exterior of the sleeve intermediate the sealing rings; said conduit having a bore communicating said annular fluid-tight area with the atmosphere; and a valve and companion valve seat disposed to control flow of fluid through said conduit; said valve having means operably connected to said chamber to effect movement toward a closing position with said valve seat as the chamber is compressed by fluid pressure.

4. The combination with a fluid conduit having a fixed valve seat through which fluid flowing through the conduit must pass, of a valve comprising a yieldably biased pressure responsive fluid-tight walled chamber adapted to be inserted into the conduit and permit a substantial flow of fluid thereby; a sleeve member disposed within said conduit and supporting said walled chamber; a valve seat carried by said sleeve member; a cooperating valve for movement into and away from valving relation with said valve seat and operably connected to said walled chamber for movements responsive to variations in fluid pressure thereon; and means venting the interior of said walled chamber externally of said conduit.

5. A pressure sensitive valve comprising in combination a fluid conduit; a valve seat fixed in said conduit through which fluid flowing through the conduit must pass; a supporting sleeve disposed entirely within said conduit; a piston supported by said sleeve coaxially with said conduit; a cylinder having one end closed and receiving said piston through the open opposed end; means yieldably urging separation of said piston and cylinder; and a vent through said piston, sleeve and conduit communicating the chamber enclosed by said piston and cylinder to the atmosphere.

References Cited in the file of this patent
UNITED STATES PATENTS

| | | |
|---|---|---|
| 332,568 | Stewart | Dec. 15, 1885 |
| 938,372 | Dimond | Oct. 26, 1909 |

(Other references on following page)

UNITED STATES PATENTS

| | | |
|---|---|---|
| 952,410 | Bice | Mar. 15, 1910 |
| 1,406,015 | Hinchman | Feb. 7, 1922 |
| 1,742,323 | Slagel | Jan. 7, 1930 |
| 2,312,251 | Johnson | Feb. 23, 1943 |
| 2,322,468 | Redrup | June 22, 1943 |
| 2,702,048 | Coffey | Feb. 15, 1955 |

FOREIGN PATENTS

| | | |
|---|---|---|
| 7,769 | Germany | Feb. 1, 1879 |
| 51,146 | Norway | July 11, 1932 |
| 434,196 | Great Britain | Aug. 19, 1935 |